United States Patent
Gardner, Jr. et al.

(10) Patent No.: US 6,331,714 B1
(45) Date of Patent: Dec. 18, 2001

(54) GUIDANCE SYSTEM AND METHOD FOR AN AUTOMATED MEDIA EXCHANGER

(75) Inventors: Richard Lynn Gardner, Jr., Greeley; Joseph M. White, Windsor; Matthias Albert Lester; Richard A. Irwin, both of Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/291,242

(22) Filed: Apr. 13, 1999

(51) Int. Cl.[7] ............................. G01N 21/88; G01B 11/14
(52) U.S. Cl. ...................................... 250/559.29; 356/614
(58) Field of Search .................................. 356/373, 375, 356/153; 250/559.29; 369/34

(56) References Cited

U.S. PATENT DOCUMENTS

| | | | |
|---|---|---|---|
| 5,207,003 | 5/1993 | Yamada et al. | 356/153 |
| 5,416,914 | 5/1995 | Korngiebel et al. | 369/34 |
| 5,589,939 | 12/1996 | Kitajima | 356/375 |
| 5,644,559 | 7/1997 | Christie, Jr. et al. | 369/36 |
| 5,682,096 | 10/1997 | Christie, Jr. et al. | 324/207.2 |
| 5,812,266 | 9/1998 | Hercher | 356/375 |

Primary Examiner—F. L. Evans
Assistant Examiner—Zandra Smith

(57) ABSTRACT

A system to guide a media handler used by an automated media exchanger is disclosed. The automated media exchanger is of the type that uses an imaging apparatus to identify media located in the automated media exchanger. The imaging apparatus images a guidance target that is affixed to a predetermined location relative to media within the automated media exchanger. The guidance target comprises a first edge and a second edge, wherein the first edge and the second edge define boundaries of reflective difference. A first axis intersects the first edge at a first point and the second edge at a second point. The distance between the first point and the second point corresponds to a location on a second axis. The system measures the distance between the two points to correlate the location, relative to the second axis, where the target was imaged. The location of the imaging apparatus and, thus, the media handler, may, be readily determined relative to the media.

28 Claims, 6 Drawing Sheets

GUIDANCE SYSTEM AND METHOD FOR AN AUTOMATED MEDIA EXCHANGER

FIELD OF THE INVENTION

The present invention relates generally to a guidance system used within an automated media exchanger and, more particularly, to using an imaging apparatus to guide a media handler located within an automated media exchanger.

BACKGROUND OF THE INVENTION

An automated media exchanger is a device generally comprising a media library, a media handler, and media players. The automated media exchanger stores media, e.g., digital linear tape cartridges, in the library. When the information contained on a particular piece of media is required by a user, the media handler extracts the media from the library, transports the media to a media player, and inserts the media into the media player. The media players are devices that convert the media to a usable format, e.g., the media players may be digital linear tape players as are known in the art. The automated media exchanger may also include an imaging apparatus affixed to the media handler. The imaging apparatus is used to identify the media. Bar codes that identify the media may, as an example, be affixed to the media and the imaging apparatus may be adapted to read the bar codes to identify the media in a conventional manner.

The library typically comprises a plurality of media magazines. The magazines are generally parallelepiped structures comprising a plurality of slots or openings that are adapted to hold the media. A user may fill the magazines with media and then the user may place the magazines into the library within the automated media exchanger. There is generally some tolerance between the magazines and the structures supporting the magazines in the media library, thus, the media may be located at imprecise locations relative to the automated media exchanger. Additionally, the magazines may abut each other within the automated media exchanger, which creates additional tolerances that add to the imprecision in the location of the media. These tolerances accumulate to create a tolerance stack between the location of the media and the automated media exchanger. The location of the media with reference to the automated media exchanger, thus, becomes more imprecise as the tolerance stack increases.

The process of moving media from the library to a media player involves moving the media handler to a position adjacent to a specific piece of media in a magazine. The media handler then moves to extract the media from a specified slot in a specified magazine where the media is held. The media handler then moves adjacent to a specified media player and inserts the media into the media player. Likewise, the media handler may extract media from a media player and insert the media into a specified slot in a magazine by reversing the above-described procedure. The insertion and extraction of the media into and out of the magazines and the media player requires that the media handler precisely contact the media. If the media handler does not precisely contact the media, damage may occur to the media, the library, the media handler, and the media player.

The imprecise location of the media relative to the media handler creates problems when the automated media exchanger moves media into or out of a magazine or a media player. For example, the imprecision impedes the ability of the media handler to quickly extract and insert media into and out of a magazine and a media player without the risk of damaging the components that comprise the automated media exchanger. In order to precisely contact the media, the media handler may have to slow down to orient itself relative to the media prior to contacting the media. The media handler may, as an example, have to physically sense the location of the media in order to orient itself, which increases the operating time of the automated media exchanger.

The problem of locating the media relative to the media handler may be substantially resolved by aligning the previously described imaging apparatus, which may be affixed to the media handler, the media handler, the slots in the magazines, and other components in the automated media exchanger. An example of precisely aligning an imaging apparatus to a media handler to which it is affixed is described in U.S. patent application, Ser. No. 09/290,429 of Gardner et al. for IMAGING APPARATUS ALIGNMENT SYSTEM AND METHOD, filed on the same day as this application, which is hereby incorporated by reference for all that is disclosed therein.

Even when the imaging apparatus is aligned to the media handler, however, it is possible that the media handler itself may not be properly aligned to the other components in the automated media exchanger. This improper alignment may be due to misalignment between the image beam, which is associated with the imaging apparatus, and the aforementioned components. As previously described, proper alignment between the media handler and the magazine slots, and thus, the media, is critical in order for the media handler to successfully extract media from the magazine or to insert media into the magazine. Proper alignment between the media handler and the media players is also critical for media exchanges between the media handler and the media players.

Therefore, a need exists for an alignment system that will align the image beam associated with an imaging apparatus to the components located within an automated media exchanger.

SUMMARY OF THE INVENTION

A guidance system for use by an automated media exchanger is disclosed. The automated media exchanger is of the type that uses an imaging apparatus to identify media located in the automated media exchanger. The guidance system aligns an image beam associated with the imaging apparatus to guidance targets located within the automated media exchanger. Based on the alignment of the imaging apparatus to the guidance targets, the automated media exchanger determines the location of the imaging apparatus and any device to which the imaging apparatus is affixed, such as the media handler used by the automated media exchanger. The automated media exchanger may then accurately guide the media handler to precise locations within the automated media exchanger relative to the guidance targets.

The guidance system incorporated into an automated media exchanger may comprise guidance targets and an imaging apparatus affixed to a media handler. The guidance targets may be positioned at predetermined locations relative to the media and other components located within the automated media exchanger. The imaging apparatus may convert an image of a guidance target to machine-readable image data. The automated media exchanger may analyze the image data and, based on this analysis, determine the position of the media handler relative to the guidance target.

A guidance target may comprise a first edge and a second edge. The first edge and the second edge may define boundaries of reflective difference, such as the transition from a reflective to a nonreflective surface. The image of the guidance target is generated along a first axis where the first axis intersects the first edge at a first point and the second edge at a second point. The distance between the first point and the said second point corresponds to a location on a second axis.

DETAILED DESCRIPTION OF THE DISCLOSURE

Figure 1:
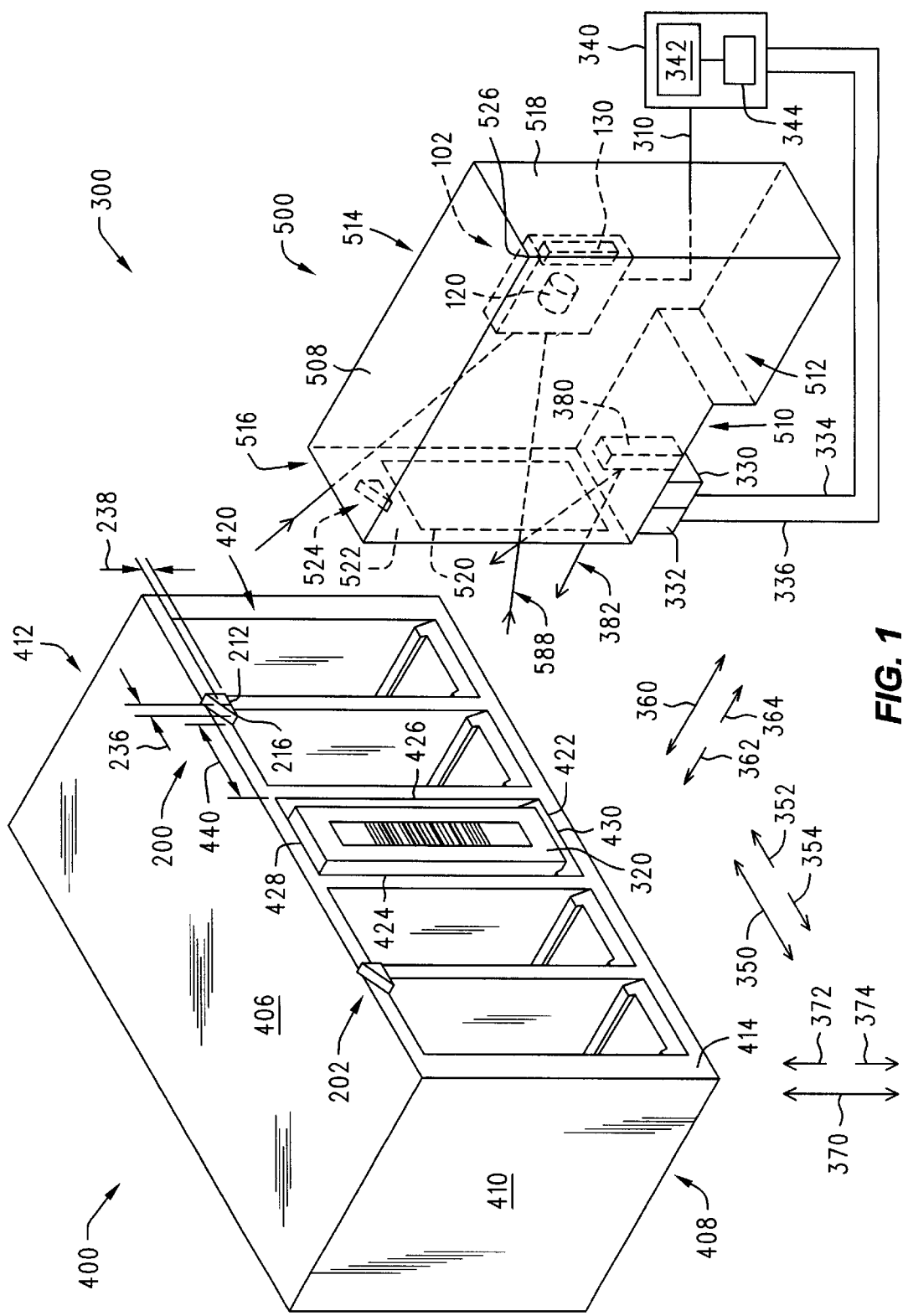
FIG. 1 is a side perspective view of a portion of an automated media exchanger.

FIGS. 1–6, in general, illustrate a system for locating the position of objects. The system may include a target 200; and an imaging apparatus 102, wherein the imaging apparatus 102 is movable relative to the target 200. The target 200 comprises a first edge 212 and a second edge 214, the first edge 212 and the second edge 214 define boundaries of reflective difference, wherein a first axis 234 intersects the first edge 212 at a first point 232 and the second edge 216 at a second point 230, and wherein the distance 238 between the first point 232 and the second point 230 corresponds to a location on a second axis.

FIGS. 1–6, in general, also illustrate an automated media exchanger 300 incorporating a guidance system, the automated media exchanger 300 comprising an imaging apparatus 102 and a target 200. The imaging apparatus 102 is mobile relative to the target 200. The target 200 is located at a predetermined location in the automated media exchanger 300. The target 200 comprises a first edge 212 and a second edge 214, the first edge 212 and the second edge 214 define boundaries of reflective difference, wherein a first axis 234 intersects the first edge 212 at a first point 232 and the second edge 216 at a second point 230, and wherein the distance 238 between the first point 232 and the second point 230 corresponds to a location on a second axis.

FIGS. 1–6, in general, also illustrate a method of locating objects, the method comprising: providing a target 200 associated with an object to be located, the target 200 comprising a first edge 212 and a second edge 214, the first edge 212 and the second edge 214 defining boundaries of reflective difference, wherein a first axis 234 intersects the first edge 212 at a first point 232 and the second edge 216 at a second point 230, and wherein the distance 238 between the first point 232 and the second point 230 corresponds to a location on a second axis; providing an imaging apparatus 102 wherein the imaging apparatus 102 is movable relative to the target 200; moving the imaging apparatus 102 adjacent to the target 200; imaging the target 200 with the imaging apparatus 102; and performing an analysis on the image wherein the analysis yields a location on the second axis.

FIGS. 1–6, in general, also illustrate a method of locating media in an automated media exchanger 300, the method comprising: providing a media holding device 400; providing a target 200 affixed to the media holding device 300, the target 200 comprising a first edge 212 and a second edge 214, the first edge 212 and the second edge 214 defining boundaries of reflective difference, wherein a first axis 234 intersects the first edge 212 at a first point 232 and the second edge 216 at a second point 230, and wherein the distance 238 between the first point 232 and the second point 230 corresponds to a location on a second axis; providing an imaging apparatus 102, wherein the imaging apparatus 102 is movable relative to the target 200; moving the imaging apparatus 102 adjacent to the target 200; imaging the target 200 with the imaging apparatus 102; performing a first analysis on the image of the target 200 to measure the distance 238 between the first point 232 and the second point 230; and performing a second analysis to determine the location on the second axis that correlates to the distance 238 between the first point 232 and the second point 230.

Having thus generally described the guidance system and a guidance method, the system and method will now be described in further detail.

FIG. 1 illustrates an automated media exchanger 300 that is of the type that uses an imaging apparatus 102 to identify media that is stored within the automated media exchanger 300. Only the components comprising the automated media exchanger 300 that are necessary to describe the operation of the automated media exchanger 300, including locating media stored within the automated media exchanger 300, are illustrated herein. The automated media exchanger 300 will be summarized directly below and described in greater detail further below.

Except for the addition of the guidance targets 200 and 202, and the imaging apparatus 102, as will be described in further detail below, the automated media exchanger 300, including the components thereof, may, for example, be of the type commercially available from the Hewlett-Packard Company and sold as Model Number HP 4226w or of the type described in either of the following U.S. Pat. No. 5,644,559 of Christie, et al., for FLIP LATCH ASSEMBLY FOR MEDIA AUTOCHANGER; and U.S. Pat. No. 5,682,096 of Christie, et al., for METHOD AND APPARATUS FOR MONITORING OPERATING POSITIONS OF A MEDIA AUTOCHANGER, which are both hereby incorporated by reference for all that is disclosed therein.

The automated media exchanger 300 may comprise a magazine 400, a media handler 500, a light source 380, an imaging apparatus 102, and a processor 340. The imaging apparatus 102 may be affixed to the media handler 500. The imaging apparatus 102 may, as an example, be a bar code reader as is known in the art. Guidance targets 200 and 202 may be positioned at predetermined locations relative to the magazine 400. Guidance targets 200 and 202 may be substantially identical; accordingly, only the guidance target 200 will be described in detail herein.

Additionally, a servo system 330 and an orientation system 332 may be affixed to the media handler 500 in a conventional manner. The servo system 330 may serve to move the media handler 500 in a conventional manner. The orientation system 332 may indicate the displacement of the media handler 500. Specifically, the orientation system may indicate the displacement of the media handler 500 relative to a predetermined point within the automated media exchanger 300.

The automated media exchanger 300 stores media in the magazine 400. When a user requires the information stored on a specific piece of media, the media handler 500 extracts the media from the magazine 400 and transports the media to a media player, not shown. The media player converts the contents of the media to a usable format. The media handler 500 also serves to transport media from the media players to the magazine 400 and to insert the media into specific locations in the magazine 400. Bar codes may be affixed to the media, wherein the bar codes serve to identify the media as is known in the art. The imaging apparatus 102 may be affixed to the media handler 500 and the imaging apparatus 102 may serve to "read" the bar codes affixed to the media in order to identify the media in a conventional manner.

The automated media exchanger 300 may comprise a plurality of magazines. For illustration purposes, however, only the single magazine 400 is illustrated in FIG. 1. The magazines may be placed into the automated media exchanger 300 in a conventional manner by the user. As an example, the magazines may slide on a track, not shown, located in the automated media exchanger 300 until they encounter a physical barrier, e.g., another magazine. The structure holding the magazines in the automated media exchanger 300 typically has some tolerance, thus, the location of the media stored in the magazines may be imprecise relative to the media handler 500. Additionally, the magazines may abut each other. If the sizes of the magazines vary from one to another, this abutting may create further imprecision in the location of the media relative to the media handler 500.

When the media handler 500 attempts to exchange media, the media handler 500 has to be precisely aligned to the media prior to contacting the media. If the media handler 500 is not precisely aligned to the media, the media handler 500 may improperly contact the media. This improper contact may cause damage to the media, the media players, the magazine 400, the media handler 500, and other components comprising the automated media exchanger 300.

Conventional automated media exchangers may have difficulty properly contacting the media because the media may be located at imprecise positions within the automated media exchanger due to the aforementioned tolerances. In order to contact the media properly, the media handler may have to slow down and orient itself relative to the media prior to contacting the media. This orientation process increases the time required by the conventional automated media exchanger to extract media from a magazine. The same orientation problems occur when the media handler inserts media into a magazine and when the media handler inserts and extracts media into and out of the media players. Conventional orientation systems are not able to overcome these problems because they only indicate the displacement of the media handler relative to a predetermined point within the automated media exchanger. These conventional orientation systems are, thus, unable to account for the aforementioned tolerances that cause the media to be located at imprecise locations within the automated media exchanger.

The automated media exchanger 300 disclosed herein overcomes the aforementioned orientation problems by the use of guidance targets, of which the guidance target 200 is an example. The guidance targets may be positioned at predetermined locations relative to the magazines, the media players, and other components located in the automated media exchanger 300. The imaging apparatus 102, affixed to the media handler 500, generates an image of a guidance target. As will be described in detail below, the automated media exchanger 300 analyzes the image of the guidance target and is able to determine the precise location of the media handler 500 relative to the guidance target. The automated media exchanger 300 is, thus, readily able to determine the location of the media handler 500 relative to the object to which the guidance target is affixed, e.g., the magazine 400. The servo system 330 is then able to guide the media handler 500 so as to properly contact the media regardless of imprecision in the location of the magazines or the media players within the automated media exchanger 300. The media handler 500 may then expeditiously exchange media between the magazines and the media players.

Having summarized the automated media exchanger 300, including the use of the guidance target 200, the automated media exchanger 300 will now be described in detail below. An example of guiding the media handler 500 to extract a digital linear tape cartridge 320 from the magazine 400 will be described in detail further below. The automated media exchanger 300 described herein is depicted as being adapted to operate with digital linear tape cartridges. It is to be understood, however, that the automated media exchanger 300 may be adapted to operate with other forms of media, e.g., compact discs.

As was previously described, the automated media exchanger 300 may comprise a plurality of magazines, however, only the single magazine 400 will be described herein. The magazine 400 may be a generally parallelepiped structure having a top side 406, a bottom side 408, a left side 410, a right side 412, a front side 414, and a back side, not shown. The magazine 400 may comprise a plurality of slots 420 formed in the front side 414. The slots 420 may be openings that are adapted to hold the digital linear tape cartridges which the media handler 500 moves between the magazine 400 and the media players, not shown. The magazine 400 is illustrated with a slot 422 occupied by the digital linear tape cartridge 320. The shape of the slot 422 may be defined by the boundaries of a left side 424, a right side 426, a top side 428, and a bottom side 430. The remaining slots 420 in the magazine 400 may have the same shape as slot 422. A plurality of guidance targets may be positioned at predetermined locations on the magazine 400. The magazine 400 of FIG. 1 is illustrated with two guidance targets 200 and 202 affixed to the front side 414 of the magazine 400. The following description of the automated media exchanger 300 will focus on the guidance target 200 located nearest the right side 412 of the magazine 400. The guidance target 200 will be described in detail below.

The media handler 500 may be a generally parallelepiped structure having a top side 508, a bottom side 510, a left side 512, a right side 514, a front side 516, and a back side 518. FIG. 1 illustrates the media handler 500 with the left side 512 open in order to view the components located in the media handler 500. The intersection of the top side 508, the left side 512, and the back side 518 may define a corner 526. The front side 516 may have an opening 520. The opening 520 may be appropriately sized so that the digital linear tape cartridge 320 may pass through the opening 520 and into the media handler 500. A lip 522 may extend on the front side 516 from the top side 508 to the opening 520. An alignment target 524 may be located on the lip 522 so as to face the interior of the media handler 500. The alignment target 524 may function in a similar manner as the alignment target described in the U.S. patent application, Ser. No. 09/290,429 of Gardner et al., previously referenced.

The servo system 330 and the orientation system 332 may be operatively attached to the media handler 500 in a conventional manner. The servo system 330 may be connected to the processor 340 by a servo data line 334. The orientation system 332 may be connected to the processor 340 by an orientation data line 336. The servo system 330 may serve to move the media handler 500 within the automated media exchanger 300 in a conventional manner. The orientation system 332 may serve to output data to the processor 340 indicating the location of the media handler 500 relative to a predetermined location within the automated media exchanger 300.

The servo system 330 may move the media handler 500 in a transverse direction 350, a plunge direction 360, and a vertical direction 370. The transverse direction 350 may be a direction that extends between the left side 410 and the right side 412 of the magazine 400 and that is parallel to the plane defined by the front side 414 of the magazine 400. A positive transverse direction 352 may be a transverse direction 350 from the left side 410 toward the right side 412 of the magazine 400. A negative transverse direction 354 may be a transverse direction 350 from the right side 412 toward the left side 410 of the magazine 400. The plunge direction 360 may be a direction that is normal to a plane defined by the front side 414 of the magazine 400 and perpendicular to the transverse direction 350. A positive plunge direction 362 may be a plunge direction 360 toward the magazine 400 and a negative plunge direction 364 may be a plunge direction 360 away from the magazine 400. The vertical direction 370 may be a direction that is perpendicular to the transverse direction 350 and the plunge direction 360. A positive vertical direction 372 may be a vertical direction 370 from the bottom side 408 toward the top side 406 of the magazine 400. A negative vertical direction 374 may be a vertical direction 370 from the top side 406 toward the bottom side 408 of the magazine 400.

The light source 380 may be located in the interior of the media handler 500. The light source 380 may emit an incident beam 382, which is a light beam that serves to illuminate objects that may be imaged by the imaging apparatus 102, including the guidance target 200. Examples of light sources that may be used in the media handler 700 are disclosed in the following U.S. patent applications: Ser. No. 09/290,842 of Gardner for OPTICAL ASSEMBLY HAVING LENS OFFSET FROM OPTICAL AXIS, filed on the same date as this application; and Ser. No. 09/292,781 of Gardner for LOW POWER ILLUMINATOR, filed on the same date as this application; both of which are hereby incorporated by reference for all that is disclosed therein.

Figure 2:
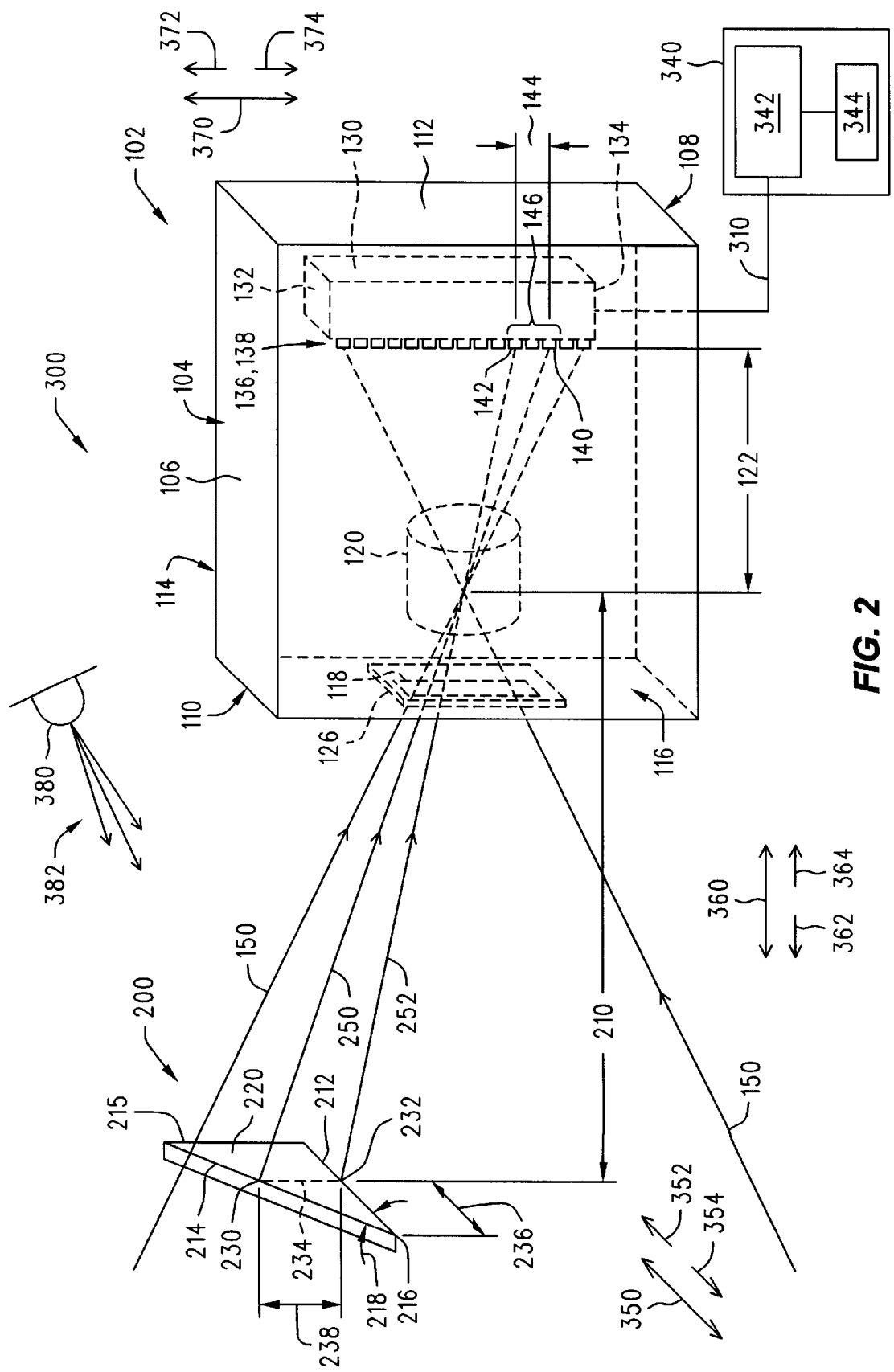
FIG. 2 is a side perspective view of the automated media exchanger of FIG. 1 detailing the association between a guidance target and an imaging apparatus.

FIG. 2 is a side perspective view of the imaging apparatus 102 and the guidance target 200. FIG. 2 is provided as a detailed illustration of the association between the guidance target 200 and the imaging apparatus 102. For the purpose of illustration, the other components associated with the automated media exchanger 300 have been removed from the view of FIG. 2. The imaging apparatus 102 may comprise a housing 104 having a top side 106, a bottom side 108, a front side 110, a back side 112, a right side 114, and a left side 116. The left side 116 of the imaging apparatus 102 is depicted in FIG. 2 as being open in order to better illustrate the components located in the interior of the imaging apparatus 102. The front side 110 may have an opening 118 that may serve to allow light to enter the imaging apparatus 102.

The interior of the imaging apparatus 102 may comprise a lens 120, a window 126, and a photosensor 130. The window 126 may be a pane of transparent material that is located in the opening 118 in the front side 110 of the imaging apparatus 102 and may serve to keep contaminates from entering the housing 104. Additionally, the window 126 may be a pane of material that is transparent to a selected band of light frequencies and may, thus, serves as an optical filter.

The lens 120 may be mounted to the right side 114 of the imaging apparatus 102 and may be located an image distance 122 from the photosensor 130. The lens 120 may be a lens as is known in the art that focuses an image beam 150 of light onto the photosensor 130. The lens 120 has a focal length that is dependent on the shape and other optical characteristics of the lens 120. As an example of the optical characteristics of the lens 120, the lens 120 may comprise a plurality of different types of lenses. The focal length of the lens 120 may, thus, depend on the focal lengths of the individual lenses, the types of individual lenses, and the distances between the individual lenses. An example of the lens 120 that may be used in the imaging apparatus 102 is commonly known in the art as a Cooke triplet. Other examples of lenses that may be used in the imaging apparatus 102 are disclosed in the following U.S. patent applications: Ser. No. 09/290,216 now U.S. Pat. No. 6,265,705 of Gardner for ALIGNMENT APPARATUS AND METHOD FOR AN IMAGING SYSTEM, filed on the same date as this application; and U.S. Pat. No. 6,118,598 of Gardner for METHOD AND APPARATUS FOR SETTING FOCUS IN AN IMAGING DEVICE, filed on the same date as this application; which both hereby incorporated by reference for all that is disclosed therein and Ser. No. 09/290,429 of Gardner, previously referenced.

The photosensor 130 serves to convert light to image data. The photosensor 130 illustrated in FIG. 2 is depicted as being a charged coupled device, however, it is to be understood that other photosensor devices may be substituted for the charged coupled device described herein. The photosensor 130 may have a first end 132 and a second end 134. The photosensor 130 may have a linear array 136 of photodetectors 138 extending between the first end 132 and the second end 134. A typical photodetector 138 may be approximately 11 microns wide and, thus, the array 136 may be approximately 11 microns wide. There may be approximately 2,700 photodetectors 138 in the array 136. The distances between the centerlines of the photodetectors 128 may be predetermined and substantially constant. The photosensor 130 may output image data to the processor 340 wherein the image data corresponds to the intensity of light received by the photodetectors 138. For illustration purposes, the size of the photodetectors 138 illustrated in FIG. 2 has been greatly enlarged.

The photosensor 130 may be electrically connected to the processor 340 by a data line 310. The processor 340 may comprise a microprocessor 342 and a data storage device 344 as are known in the art. The microprocessor 342 may receive and analyze the image data output from the photosensor 130. The data storage device 344 may store the image data received from the photosensor 130 in addition to data values required by the microprocessor 342 to analyze image data from the photosensor 130.

The imaging apparatus 102 may receive light from an image beam 150. The image beam 150 may be in the shape of a fan-shaped plane wherein the fan-shape is narrowest at the lens 120. The image beam 150 may be approximately as thin as the array 136 of photodetectors 138, e.g., 11 microns. The image beam 150 may be approximated as being an infinitely thin fan-shaped plane for the purpose of using the image beam 150 to guide the media handler 500. The image beam 150 may extend from points external to the imaging apparatus 102, through the window 126 and to the lens 120. As described above, the lens 120 serves to focus the image beam 150 onto the array 136 of photodetectors 138. The image beam 150 and other light beams and light paths used in the automated media exchanger 300, will be described in detail below.

The imaging apparatus 102 has a magnification defined as the size of the image of an object as it appears on the photosensor 130 divided by the actual size of the object that created the image. The automated media exchanger 300 uses the magnification of the imaging apparatus 102 when it analyzes the image data output by the photosensor 130. The magnification of the imaging apparatus 102 may be measured by conventional optical methods and stored in the data storage device 314. Alternatively, the magnification of the imaging apparatus 102 may be measured by using the system and method described in U.S. patent application Ser. No. 09/290,807 Now U.S. Pat. No. 6,194,697, for CALIBRATION SYSTEM FOR AN IMAGING APPARATUS AND METHOD of Gardner, filed on the same date as this application, which is hereby incorporated by reference for all that is disclosed therein.

Figure 3:
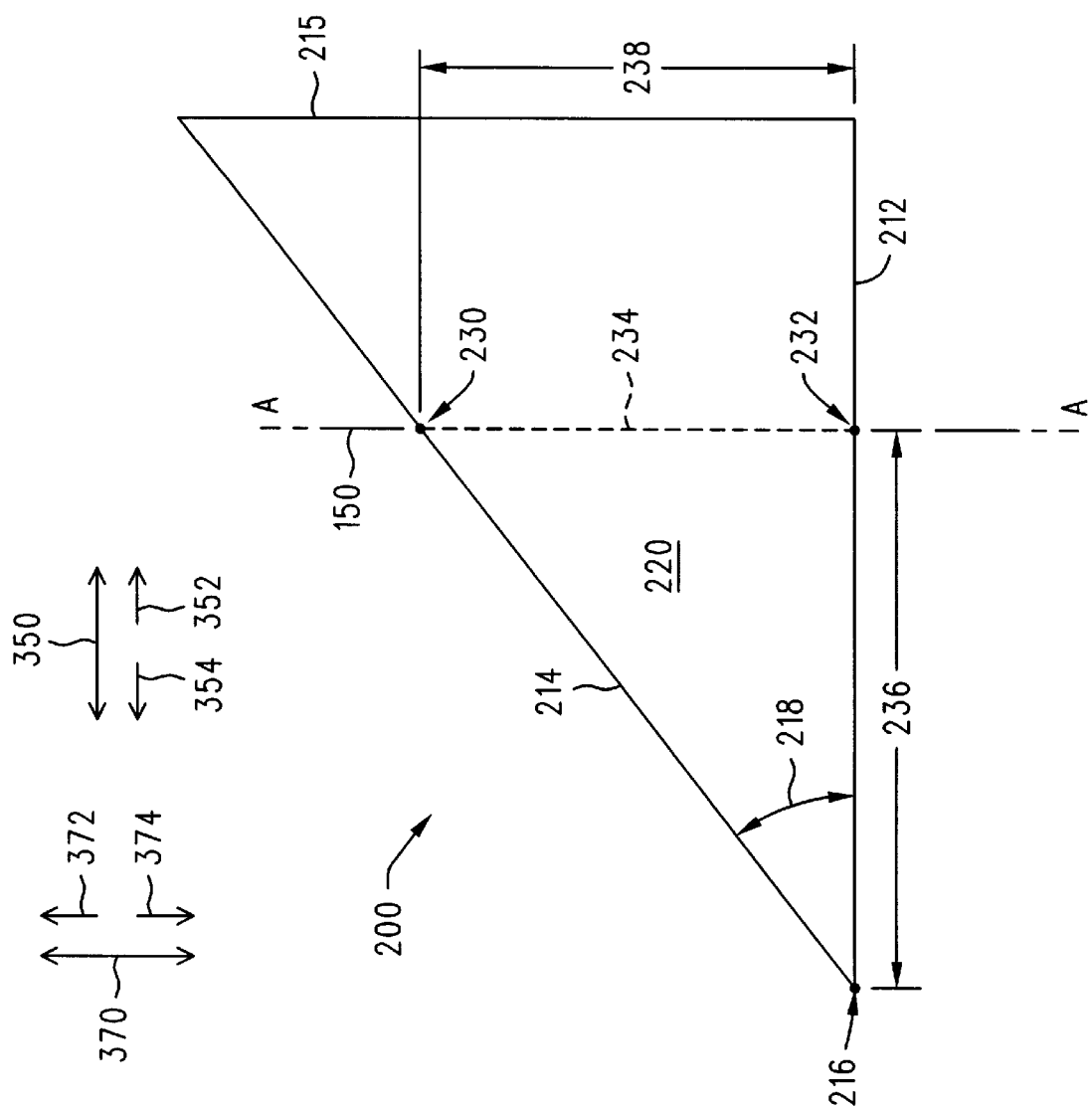
FIG. 3 is a front elevation view of the guidance target of FIGS. 1 and 2.

FIG. 3 is a front view of the guidance target 200 illustrated in FIGS. 1 and 2. The guidance target 200 may, as an example, be in the shape of a right triangle. The triangular shape of the guidance target 200 may be defined by the boundaries of a target base 212, a target height 215, and a target hypotenuse 214. The target base 212 and the target hypotenuse 214 may intersect at a vertex 216 to form a vertex angle θ, depicted numerically as 218. The guidance target 200 may have a surface 220 defined by the boundaries of the target base 212, the target hypotenuse 214, and the target height 215. The surface 220 may be a reflective surface, such as a light-colored surface. The reflectivity of the surface 220 may be substantially uniform by making the surface 220 substantially flat and having the color of the surface 220 substantially consistent throughout the surface 220.

When the imaging apparatus is used for guidance purposes, the image beam 150 may intersect the surface 220 of the guidance target 200. The image beam 150 is depicted as a reference line AA in FIG. 3. The image beam 150 may intersect the target hypotenuse 214 at a hypotenuse point 230. The image beam 150 may also intersect the target base 212 at a base point 232. A scan line portion 234 of the guidance target 200 may be formed on the surface 220 of the guidance target 200 and may extend between the hypotenuse point 230 and the base point 232. The scan line portion 234 of the guidance target 200 may have a scan length 238 extending between the hypotenuse point 230 and the base point 232. The scan line portion 234 of the guidance target 200 is the portion of the guidance target 200 that will be imaged by the imaging apparatus. The base point 232 is located a base distance 236 from the vertex 216. The automated media exchanger will use the base distance 236 to determine the transverse location 350 of the image beam 150 relative to the vertex 216. The base distance 236 will be calculated by the automated media exchanger based on the scan length 238. The base distance 236 is related to the scan length 238 by the following equation:

$$\text{base distance (236)} = \frac{\text{scan length (238)}}{\tan\theta}$$

where θ is depicted numerically as 218.

Referring again to FIG. 2, imaging the scan line portion 234 of the alignment target 200 may be described by separating the image beam 150 into constituents that image separate portions of the guidance target 200. Specifically, the image beam 150 may be separated into a hypotenuse beam 250 and a base beam 252. The hypotenuse beam 250 may extend from the hypotenuse point 230, through the opening 118 in the imaging apparatus 102, through the lens 120, and to a hypotenuse photodetector 140 located on the photosensor 130. The hypotenuse photodetector 140, thus, images the hypotenuse point 230. The base beam 252 may extend from the base point 232, through the opening 118, through the lens 120, and to a base photodetector 142 located on the photosensor 130. The base photodetector 142, thus, images the base point 232. The hypotenuse photodetector 140 and the base photodetector 142 may be separated by an image length 144. The photodetectors between, and including, the hypotenuse photodetector 140 and the base photodetector 142 are referred to herein as the target photodetectors 146.

Referring again to FIG. 1, the guidance target 200 may be affixed to a predetermined location on the magazine 400. The guidance target 200 illustrated in FIG. 1 is affixed to the magazine 400 so that the vertex 216 is located a predetermined transverse distance 440 from the right side 426 of slot 422. Additionally, the base 212 of the guidance target 200 is flush with the top side 428 of the slot 422. Because the media handler 500 is mobile relative to the magazine 400, the guidance target 200 will be located at an uncertain transverse position 350 and an uncertain vertical position 370 relative to the media handler 500. When the imaging apparatus 102 images the guidance target 200, the transverse position 350 and the vertical position 370 of the media handler 500, relative to the guidance target 200, will be accurately determined. The guidance system disclosed herein will not determine the plunge position 360 of the media handler 500 relative to the guidance target 300. The plunge position 360, however, may be determined by other means with enough accuracy to guide the media handler 500 in the transverse direction 350 and the vertical direction 370. As will be described below, small deviations in the plunge direction 360 will have generally negligible effects on guiding the media handler 500.

Using the imaging apparatus to guide the media handler 500 as disclosed herein requires that the image beam 150 be positioned at a predetermined location relative to the media handler 500. The position of the image beam 150 relative to the media handler 500 may be determined by conventional methods and stored in the data storage device 344. An example of determining the position of an image beam relative to a media handler is described in the following U.S. patent application, Ser. No. 09/290,429, of Gardner, et al., previously referenced.

The automated media exchanger 300 and the components thereof are further disclosed in the following U.S. patent applications: Ser. No. 09/290,926 now U.S. Pat. No. 6,246, 642 of Gardner, et al. for AUTOMATED OPTICAL DETECTION SYSTEM AND METHOD, filed on the same date as this application; and Ser. No. 09/290,428 of Kato et al. for METHOD OF DECIPHERING BAR CODES, filed on the same date as this application; which are both hereby incorporated for reference for all that is disclosed therein.

Having described the components comprising the automated media exchanger 300, a process of using the imaging apparatus 102 and the guidance target 200 to guide the media handler 500 will now be described. In summary, the imaging apparatus 102 may be affixed to the media handler 500. The image beam 150 associated with the imaging apparatus 102 has been previously aligned to the media handler 500, thus, the image beam 150 is located at a predetermined position relative to the media handler 500. The guidance target 200 is affixed to the magazine 400 so that the vertex 216 is located the predetermined slot distance 440 from right side 426 of the slot 422. The media handler 500 will move to a location where the imaging apparatus 102 is able to image the guidance target 200. The image data generated by the image of the guidance target 200 will be analyzed by the processor 340 to determine the transverse position 350 and the vertical position 360 of the media handler 500. The processor 340 will then calculate the precise distance the media handler 500 has to move in the transverse direction 350 and the vertical direction 370 in order to extract the digital linear tape cartridge 320 from the slot 422.

Having summarized the operation of the automated media exchanger 300, the operation will now be described in further detail. The operation of the automated media exchanger 300 is summarized by the flow chart of FIG. 4. The operation of the automated media exchanger 300 commences by a user removing the magazine 400 from the automated media exchanger 300 and loading digital linear tape cartridges into the slots 420 in the magazine 400. The user then returns the magazine 400 to the automated media exchanger 300. As previously described, the automated media exchanger 300 may comprise a plurality of magazines. In order to accommodate ease in removing and replacing the magazines, there may be tolerances between the magazines and the automated media exchanger 300 when the magazines are placed into the automated media exchanger 300. These tolerances, in addition to other tolerances relating to the location of the magazines in the automated media exchanger 300, create a tolerance stack, which leads to uncertainty in the location of the digital linear tape cartridges relative to the automated media exchanger 300. The automated media exchanger 300 described herein uses the guidance target 200 to precisely locate the digital linear tape cartridges in the magazines irrespective of the above-described tolerances.

The process of extracting a digital linear tape cartridge from the magazine 400 will be described with reference to the digital linear tape cartridge 320 located in the slot 422. The extraction process commences by the processor 340 determining the position of the media handler 500 relative to a predetermined location within the automated media exchanger 300. The processor 340, as an example, may determine the location of the media handler 500 by receiving orientation data from the orientation system 332 via the orientation data line 336. Based on the orientation data, the processor 340 may send data to the servo system 330 via the servo data line 334 instructing the servo system 330 to move the media handler 500 to the vicinity of the guidance target 200. The exact location of the guidance target 200 may be not be known, however, the imaging apparatus 102 only needs to image a section of the guidance target 200 in order for the automated media exchanger 300 to precisely guide the media handler 500. The media handler 500, thus, only needs to move to the vicinity of the guidance target 200. The servo system 330 also moves the media handler 500 in the plunge direction 360 so that the lens 120 is at a predetermined target distance 210 from the surface 220 of the guidance target 200, FIG. 2. At this target distance 210, the guidance target 200 is appropriately positioned in the depth of field of the imaging apparatus 102 so that the automated media exchanger 102 is able to measure the scan length 238 of the scan line 234 as will be described below.

When the media handler is positioned in the vicinity of the guidance target 200, the light source 380 emits the incident beam 382 and illuminates the surface 220 of the guidance target 200. The incident beam 382 is appropriately sized to encompass the surface 220 of the guidance target 200 constituting the scan line 234, e.g., the incident beam 382 and the image beam 150 intersect on the scan line 234. The scan line 234 is, thus, uniformly illuminated. Uniform illumination of the scan line 234 of the guidance target 200 simplifies the guidance procedure and increases the likelihood that the imaging apparatus 102 and the processor 340 are able to detect the guidance target 200. The frequency of light constituting the incident light beam 382 is selected so that it is in a frequency band that will best reflect from the guidance target 200, pass through the window 126 in the imaging apparatus 102, and convert to image data by the photosensor 130, FIG. 2.

The imaging apparatus 102 may now generate an image of the guidance target 200. The process of imaging the guidance target 200 is illustrated by the use of the hypotenuse beam 250 and the base beam 252, both of which are constituents of the image beam 150. The hypotenuse photodetector 140, as previously described, images the hypotenuse point 230 via the hypotenuse beam 250. The base photodetector 142, as previously described, images the base point 232 via the base beam 252. The base photodetector 142 is separated from the hypotenuse photodetector 140 by an image length 144. The photodetectors 138 between, and including, the base photodetector 142 and the hypotenuse photodetector 140 are referred to as the image photodetectors 146. The image photodetectors 146 receive an image of the scan line 234 of the surface 220 of the guidance target 200 and convert the image of the scan line 234 to image data.

The surface 220 of the guidance target 200 is substantially reflective relative to other objects that are intersected by the image beam 150. The reflectivity of the surface 220 is also substantially uniform throughout the surface 220. Thus, the image photodetectors 146 receive a higher and more uniform intensity of light than the remaining photodetectors 138 in the array 136. The image photodetectors 146, thus, output relatively high and equal voltages, which are indicative of the relatively high and uniform intensity of light they receive.

The photosensor 130 outputs the image data generated by the photodetectors 138 to the processor 340 via the image data line 310. The image data comprises a plurality of data values wherein each data value corresponds to the output of a single photodetector and, thus, each data value corresponds to the intensity of light received by the single photodetector. A high data value may, for example, correspond to a photodetector that received a high intensity of light and a low data value may, for example, correspond to a photodetector that received a low intensity of light. The image data may, as an example, be in serial format commencing with the image data from the photodetector 138 nearest the first end 132 of the photosensor 130 and terminating with image data of the photodetector 138 nearest the second end 134 of the photosensor 130.

The processor 340, via the microprocessor 342, analyzes the image data to determine the position of the imaging apparatus 102 and, thus, the media handler 500, FIG. 1, relative to the guidance target 200. The processor 340 will then use this position information to guide the media handler 500 to a specific location within the automated media exchanger 300. The processor 340 may first determine if the image data contains data corresponding to the scan line 234 of the guidance target 200, which will indicate that the imaging apparatus 102 has, in fact, imaged the guidance target 200. This may require that the processor 340 analyze the image data to determine if a sequence of photodetectors, located on the photosensor 130 in an area where the image of the scan line 234 is expected to appear, received uniform intensities of light. The processor 340 may also determine if the outputs from the sequence of photodetectors are the appropriate value to correspond to the relatively high intensity of light reflected from the guidance target 200.

If the location of the sequence of photodetectors on the photosensor 130 and the output of the sequence of photodetectors correspond to image data that could possibly represent the scan line 234, the processor 340 may measure the length of the sequence. This may be achieved by counting the number of photodetectors in the sequence, which corresponds to the scan length 238. The number of photodetectors in the sequence may then be compared to a predetermined value to determine if the number of photodetectors in the sequence is less than the predetermined value. The predetermined value corresponds to the length of the target height 215, which is the maximum possible length of the scan line 234. The predetermined value, thus, corresponds to the maximum number of photodetectors 138 that may image the scan line 234 of the guidance target 200. If the number of photodetectors comprising the sequence is less than the predetermined value, the processor 340 may conclude that the guidance target 200 has been imaged and the sequence of photodetectors is the group of image photodetectors 146.

If the data values output by the aforementioned sequence of photodetectors do not correspond to the image of the scan line 234, then the image beam 150 has not intersected the guidance target 200. The processor 340 may then send a data signal to the servo system 330 via the servo data line 334 instructing the servo system 330 to move the media handler 500 in the positive transverse direction 352 or the negative transverse direction 354. The media handler 500 may move in small increments, e.g., half the length of the target base 212, until the processor 340 is able to detect the guidance target 200. If, after moving the media handler 500 in the transverse direction 350, the processor 340 is still unable to detect the guidance target 200, the media handler may move in a vertical direction 370 and then repeat the movements in the transverse direction 350 until the processor 340 detects the guidance target 200.

When the processor 340 has determined that the guidance target 200 is being imaged, the processor 340 may analyze the image data to determine the transverse location 350 and vertical location 370 of the media handler 500 with reference to the guidance target 200. In order to determine the transverse location 350 of the media handler 500, the processor 340 may first measure the image length 144. As described above, the image length 144 is the length of the image of the scan line 234. The image length 144 may be measured by multiplying the number of image photodetectors 146 by the predetermined spacing between the centerlines of the photodetectors 138. The processor 340 may then calculate the scan length 238 on the surface 220 of the guidance target 200. The scan length 238 is equal to the image length 144 divided by the magnification of the imaging apparatus 102. As previously described, the scan length 238 corresponds to a specific base distance 236 whereby the image beam 150 is located the base distance 236 from the target vertex 216. The base distance 236 is equal to the scan length 238 divided by the tangent of the vertex angle θ, depicted numerically as 218. The processor 340 may, thus, conclude that the image beam 150 is located the base distance 236 from the target vertex 216. The location of the image beam 150 relative to the media handler 500 has been previously determined, therefore, the transverse location 350 of the media handler 500 may be readily determined relative to the target vertex 216. An example of determining the transverse location 350 of the media handler 500, FIG. 1, relative to the guidance target 200 is described below.

The vertical location 172 of the image beam 150, and hence, the vertical location 172 of the media handler 500 may be determined relative to the target base 212. Specifically, the vertical location 370 may be determined by the location where the target base 212 appears on the photosensor 130. For example, when a specified photodetector images the target base 212, the vertical location 370 of the media handler 500, FIG. 1, may correspond to a predetermined vertical location 370 that permits the media handler 500, FIG. 1, to readily access a digital linear tape cartridge without further movement in the vertical direction 370. Referring to FIG. 1, the media handler 500 may move in the vertical direction 370 until the aforementioned specified photodetector images the target base 212.

Having described the operation of the automated media exchanger 300, an example of guiding the media handler 500 will be described below. The following example focuses on extracting the digital linear tape cartridge 320 from the slot 422 in the magazine 400. In this example, the vertex 216 of the guidance target 200 is located a predetermined slot distance 440 of four centimeters from the right side 426 of the slot 422. For the purpose of this example, it is further assumed that the image beam 150 has been aligned to the media handler 500 so that when the image beam 150 intersects the vertex 216 of the guidance target 200, the media handler 500 has to move 4.2 centimeters in the negative transverse direction 354 in order to be properly positioned in the transverse direction 350 to extract the digital linear tape cartridge 322 from the slot 422. Additionally, it is assumed for the purpose of this example, that when the five-hundredth photodetector from the first end 132, FIG. 2, of the photosensor 130 images the target base 212, the media handler 500 is in the correct vertical location 370 to extract the digital linear tape cartridge 320. The angle θ, depicted numerically as 218, FIG. 2, used in this example is equal to 30 degrees.

In this example, the magazine 400 has been placed into the automated media exchanger 300 as previously described. Due to the aforementioned tolerance stacks, the digital linear tape cartridge 320 is located at an uncertain position relative to the media handler 500. Likewise, the precise position of the guidance target 200 is not known, however, the approximate position of the guidance target 200 is known. The processor 340 has the approximate location of the guidance target 200 stored in the data storage device 344. The processor 340 receives orientation data from the orientation system 332 indicating the present location of the media handler 500 relative to a predetermined location in the automated media exchanger 300. Based on the orientation data, the processor 340 instructs the servo system 330 to move the media handler 500 to a location in the automated media exchanger 300 where the imaging apparatus 102 is able to image the guidance target 200. The imaging apparatus 102 then generates an image of the scan line 234 of the guidance target 200, FIG. 2.

Referring to FIG. 2, the processor 340, as previously described, determines that the guidance target 200 is being imaged. The processor 340 then locates the base photodetector 142 on the photosensor 130. The base photodetector 142 generates an image of the base 212 of the target 200. For the purpose of this example, the five-hundredth photodetector is required to image the target base 212 in order for the media handler to properly contact the digital linear tape cartridge 320. Referring again to FIG. 1, the processor 340 instructs the servo system 330 to move the media handler 500 in the vertical direction 370 to a position where the five-hundredth photodetector images the target base 212, e.g., the five-hundredth photodetector is the base photodetector 142. The media handler 500 is, thus, in the proper vertical location 370 to extract the digital linear tape cartridge 320 form the slot 422.

Now that the media handler 500 is located in the proper vertical position 370 to extract the digital linear tape cartridge 320, the processor 340 may determine the precise transverse position 350 of the media handler 500 relative to the guidance target 200. Referring again to FIG. 2, the processor 340 measures the scan length 238 of the scan line 234 of the guidance target 200, which is used to locate the image beam 150 relative to the alignment target 200. The measurement commences by measuring the image length 144, which is equal to the number of target photodetectors 146 multiplied by the predetermined centerline distance between the photodetectors 138 in the array 136. The image length 144 is then divided by the magnification of the imaging apparatus 102, and the dividend is equal to the scan length 238. For the purpose of this example, the scan length 238 will be assumed to be three millimeters. The processor 340 then multiplies the scan length of three millimeters by the tangent of the vertex angle 218, which is assumed to be 30 degrees. The product is equal to 5.2 millimeters, which indicates that the image beam 150 has intersected the guidance target 200 5.2 millimeters from the vertex 216.

Referring again to FIG. 1, as previously described, if the image beam intersects the target vertex 216, the media handler 500 has to move 4.2 centimeters in the negative transverse direction 354 in order to properly contact and extract the digital linear tape cartridge 320 from the slot 422. The automated media exchanger 300 has determined that the image beam 150 intersected the guidance target 0.52 centimeters from the vertex 216. The media handler 500, thus, must move in the negative transverse direction 354 a distance equal to 4.2 centimeters plus 0.52 centimeters, or 4.72 centimeters. The orientation system 322 is able to precisely determine the amount of movement of the media handler 500 between points within the automated media exchanger. Therefore, the processor 340 instructs the servo system 330 to move the media handler 500 the aforementioned 4.72 centimeters in the negative transverse direction 354 from its present location. The processor 340 then sends appropriate data signals to the media handler 500 and the servo system 330 instructing them to extract the digital linear tape cartridge 320 from the slot 422 in a conventional manner. When the precise location of a slot relative to the media handler 500 has been determined as described above, the media handler 500 may move rapidly to extract the digital linear tape cartridges from the slots. The locations of the digital linear tape cartridges are determined with enough precision so that the media handler 500 is able to extract the digital linear tape cartridges without improperly contacting a digital linear tape cartridge. The risk of damage to the digital linear tape cartridges, the magazines, the media handler 500, and other components located in the automated media exchanger 300 is, thus, reduced. The media handler 500 may also return the digital linear tape cartridges to the slots in the magazines without the digital linear tape cartridges impacting the front sides of the magazines and causing damage to the aforementioned components.

Other procedures for determining the locations of the digital linear tape cartridges may be used by the automated media exchanger 300. The automated media exchanger 300 may, for example, determine the locations of the magazines and the media players only upon a command, such as when the automated media exchanger 300 is powered up. The location of the magazines and the media players may be stored in the data storage device 344. When the media handler 500 is required to contact a digital linear tape cartridge, the processor 340 may retrieve the location of the digital linear tape cartridge from the data storage device 344 and instruct the servo system 330 to move the media handler 500 to properly contact the digital linear tape cartridge.

The guidance target 200 of FIGS. 1, 2, and 3 has been depicted as being in the shape of a right triangle. A right triangle is the preferred embodiment of the guidance target because it has the geometric property whereby a specific distance between a point on the hypotenuse and a point on the base, measured perpendicular to the base, corresponds to a specific distance between the vertex and the base. A right triangle has the further benefit of being able to be positioned so that the base of the right triangle is normal to the fan-shaped plane of the image beam 150. Therefore, a single photodetector may receive an image of the triangle base as the image beam is moved in the transverse direction. The base may, thus, be used as a reference to determine the vertical position of the image beam irrespective of the transverse position of the image beam.

Figure 5:
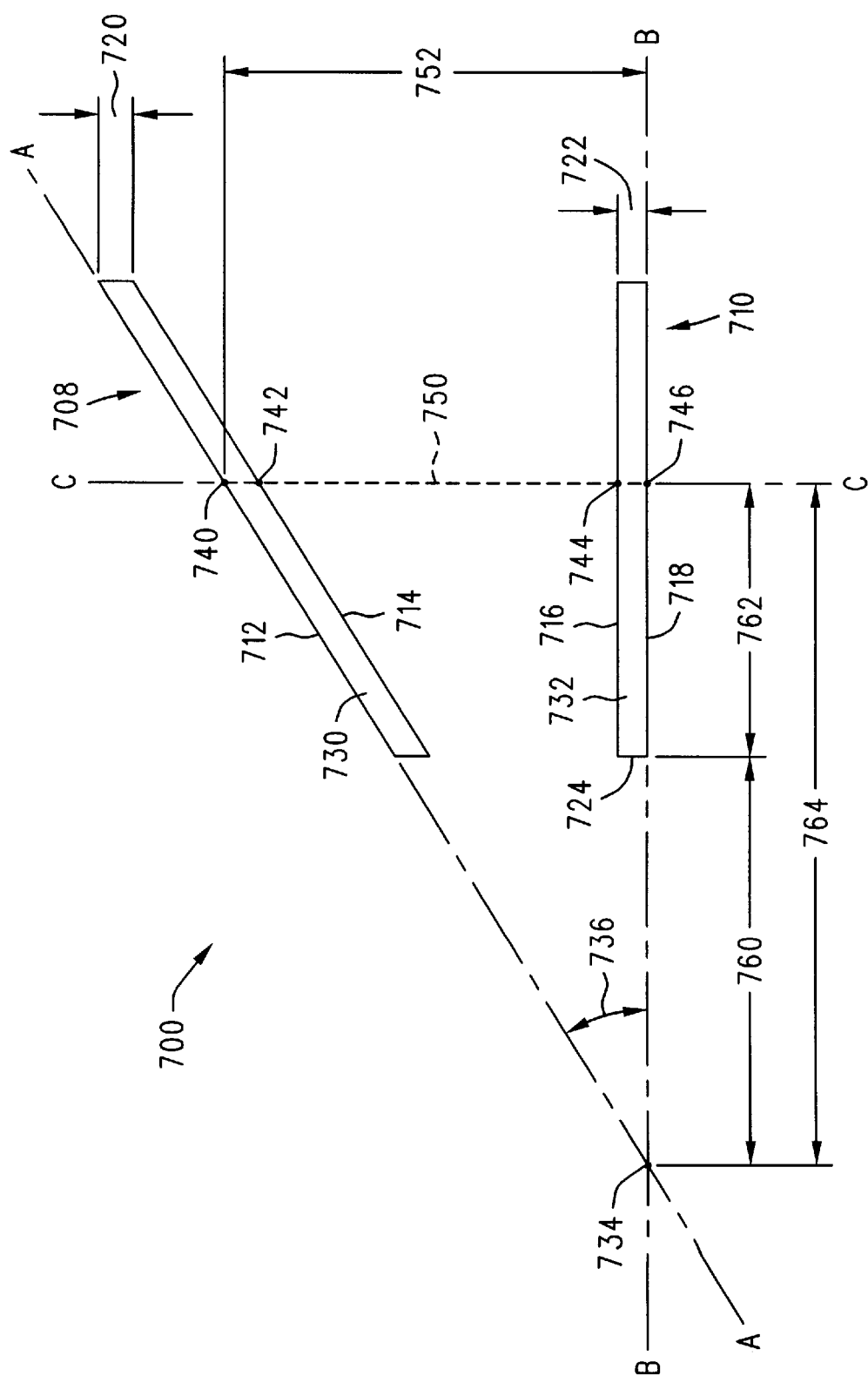
FIG. 5 is a schematic illustration of a guidance target in the form of two lines.

Other shapes may be used as guidance targets. FIG. 5 illustrates a guidance target 700 in the form of two lines 708 and 710. The guidance target 700 may comprise a first line 708 and a second line 710. The first line 708 may have a first edge 712 and a second edge 714. The second line 710 may have a third edge 716 and a forth edge 718. The second line 710 may also have a first end 724. The first edge 712 and the second edge 714 may be separated by a first width 720. The third edge 716 and the forth edge 718 may be separated by a second width 722. The area between the first edge 712 and the second edge 714 may be a first surface 730. The area between the third edge 716 and the forth edge 718 may be a second surface 732. A reference line AA may extend from the first edge 712. A reference line BB may extend from the forth edge 718. The reference line AA may intersect the reference line BB at a vertex 734 to form an angle θ, depicted numerically as 736. The locations of the first line 708 and the second line 710 may be at fixed, predetermined locations.

An image beam, depicted by the reference line CC, may intersect the first edge 712 at a first point 740 and the second edge 714 at a second point 742. The image beam may also intersect the third edge 716 at a third point 744 and a forth edge 718 at a forth point 746. A scan line 750 of the image beam may extend between the first point 740 and the forth point 746. The scan line 750 may intersect the forth edge 717 at approximately a right angle. The scan line 750 may have a scan length 752 extending between the first point 740 and the forth point 746.

The vertex 734 and the first end 724 of the second line 710 may be separated by a vertex distance 760. The first end 724 may be a scan distance 762 from the forth point 746. The vertex 734 and the forth point 746 may be separated by a vertex/scan distance 764. The vertex/scan distance 764 is the sum of the vertex distance 760 and the scan distance 762. The location of the scan line 750 may be referenced to the vertex 734 or the first end 724 by either the scan distance 762 or the vertex/scan distance 764.

The first surface 730 and the second surface 732 may be reflective surfaces on a nonreflective background, or they may be nonreflective surfaces on a reflective background. Either surface configuration will yield an optical transition that may be detected by an imaging apparatus and a processor. The first surface 730 may have a first width 720 so that the imaging apparatus associated with the scan line 750 may detect the first surface 730, the same applies to the second width 722 of the second surface 732. The imaging apparatus and processor may detect the first edge 712 and the forth edge 718. The imaging apparatus may then determine the scan length 752. The imaging apparatus may then determine the location of the scan line 750 on the second line 710. The scan line 750 may be located a vertex/scan distance 764 from the vertex. The vertex/scan distance 764 is equal to the scan length 752 divided by tangent θ. The scan line 750 may also be referenced from the first end 724 of the second line 710 by the scan distance 762. The scan distance 762 is equal to the vertex/scan distance 764 minus the vertex distance 760. As previously set forth, the second line 720 may be normal to the scan line 750. The vertical location of the scan line 750 may, thus, be referenced to the photodetector on the photosensor, not shown in FIG. 5, that images the second line 710, irrespective of the location of the location of the fourth point 746 on the fourth edge 718.

The guidance target 700 may be best suited for situations where imaging a guidance target is difficult, such as instances where images of other objects may be confused with the image of the guidance target. The guidance target 700 may alleviate this problem because the two lines 708 and 710 have distinct images, which may be distinguished from the images of other objects intersected by the image beam.

Figure 6:
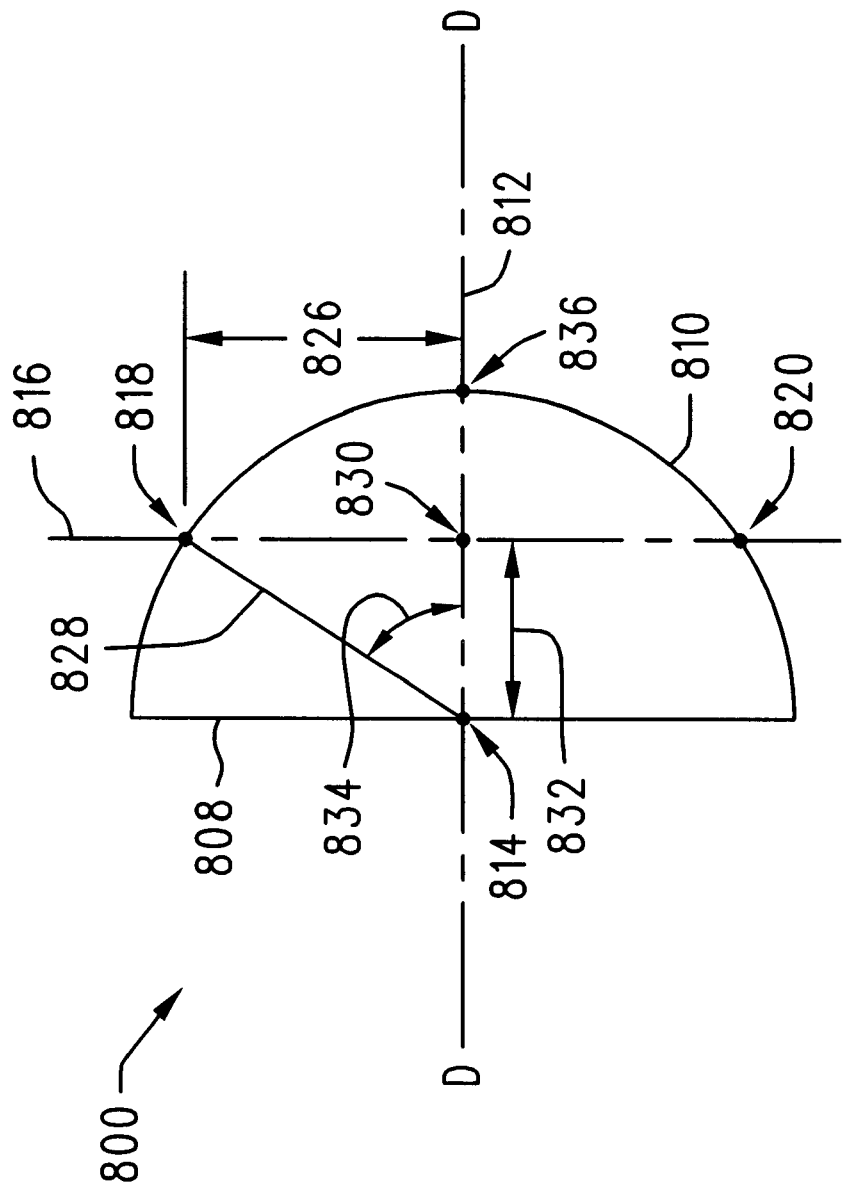
FIG. 6 is a schematic illustration of a guidance target in the form of a semicircle.

FIG. 6 illustrates an embodiment of an alignment target 800 in the shape of a semicircle. The alignment target 800 may have a diameter 808 and a circumference 810. An axis 812, depicted by the reference line DD may intersect the diameter 808 at a midpoint 814 and the circumference at a midpoint 836. The axis 812 may be perpendicular to the diameter 808. The axis 812 may be used solely as a reference and may not be a physical embodiment of the alignment target 800. The alignment target 800 may have a radius 828 extending between the midpoint 814 and the circumference 810. The radius 828 may be a predetermined distance. For the purpose of performing alignment calculations, the radius may be a unit length.

An image beam 816 may intersect the circumference 810 at a first point 818 and at a second point 820. The image beam 816 may be approximately perpendicular to the axis 812. The image beam 816 may intersect the axis 812 at an axis point 830. The axis point 830 may be located a base distance 832 from the midpoint 814. The base point 830 may be located a height distance 826 from the first point 818. A reference right triangle may, thus, be formed by the lines extending between the midpoint 814, the first point 818, and the axis point 830. An angle θ, depicted numerically as 834 may exist between the axis 812 and the radius 828.

Figure 4:
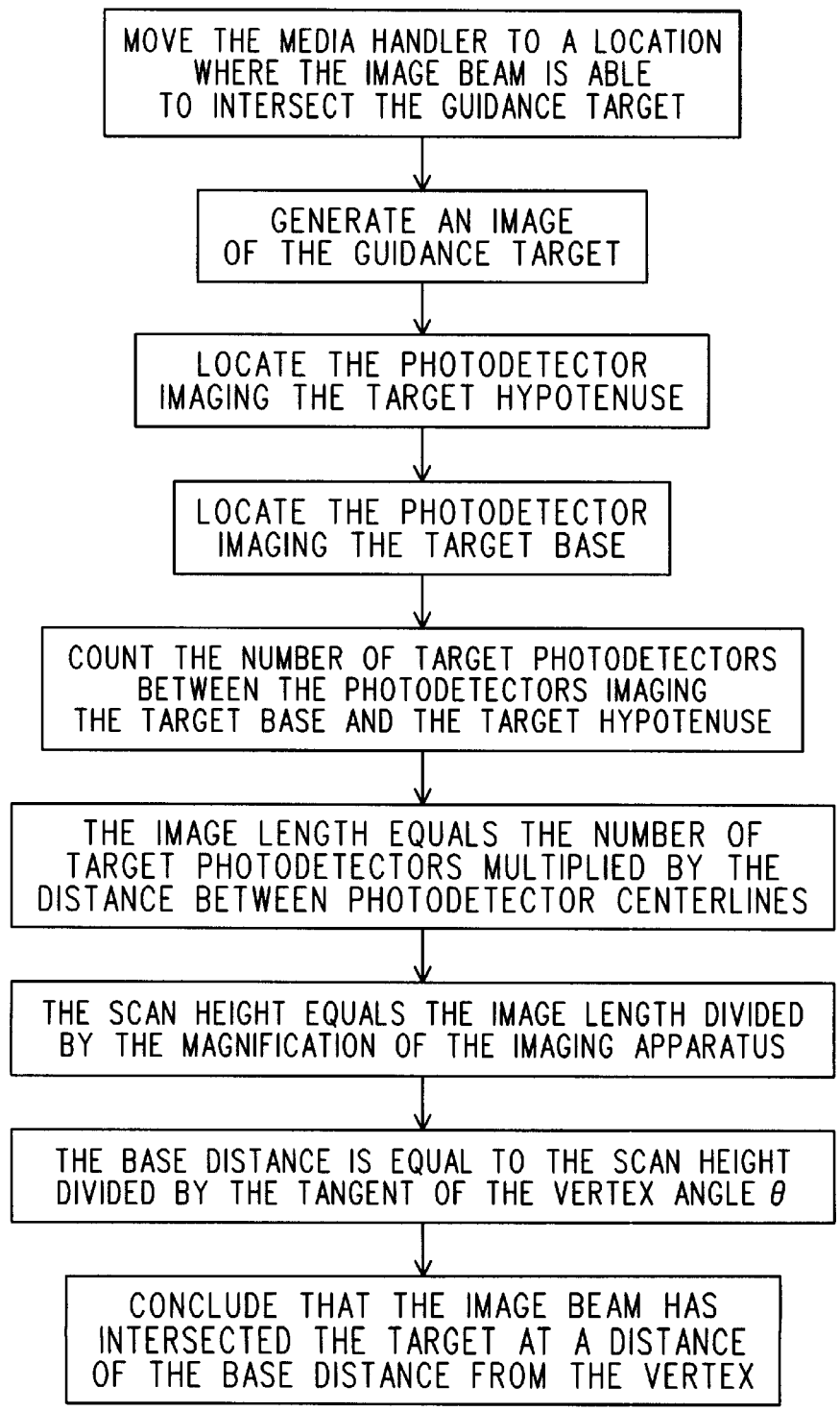
FIG. 4 is a flow chart illustrating a procedure for guiding a media handler within the automated media exchanger of FIG. 1.

The alignment target 800 may be located so that the midpoint 814 is at a predetermined location relative to the imaging apparatus, not shown in FIG. 4, that is associated with the image beam 816. The imaging apparatus may receive light from the image beam 816. The location of the image beam 816 may, thus, be referenced relative to the midpoint 814 and the axis 812. A processor, not shown in FIG. 4, may use the technique described in FIG. 2 to measure the distance between the first point 818 and the second point 820. The processor may then divide the distance between the first point 818 and the second point 820 by two to determine the distance 826. The radius may be predetermined, e.g., the radius may be a unit value, therefore, the angle θ, depicted numerically as 834, is equal to the inverse sine of the height distance 826 divided by the radius 828. The base distance 832 may then be equal to the radius 828 multiplied by the cosine of the angle θ. The transverse position of the image beam 816 is, thus, located the base distance 832 from the midpoint 814. The elevation location of the image beam 816 may be referenced to the axis 812. The axis 812 is located half way between the first point 818 and the second point 820. The photodetector located midway between the photodetector that images the first point 818 and the photodetector that images the second point 820 may be referenced as the photodetector associated with the axis 812.

The guidance target 800 may be used in circumstances where nonlinear precision in determining the location of the image beam 816 is required. The inherent properties of the semicircle provide a more precise determination of the location of the image beam 816 as the image beam intersects the semicircle 810 closer to the midpoint 836.

Other embodiments of the imaging apparatus 102, FIG. 2, may be used by the automated media exchanger 300. As an example, the imaging apparatus 102 may not require the housing 104 illustrated in FIG. 2. The automated media exchanger 300 may have means to prevent contaminants from entering the automated media exchanger 300, thus, contaminants will not interfere with the imaging apparatus 102. In lieu of the housing 104, the imaging apparatus 102 may comprise a simple support structure to which the lens 120 and the photosensor 130 may be attached. Another embodiment of the imaging apparatus 102 generates two-dimensional images of the objects. An example of a two-dimensional type of imaging apparatus is a digital camera as is known in the art.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A system for determining the position of a first object relative to a second object, said system comprising:
   an imaging apparatus associated with said first object said imaging apparatus including at least one photosensor and at least one optical component located along a light path extending between a point external to said imaging apparatus and said at least one photosensor;
   a target associated with said second object, said target comprising a first edge and a second edge, said first edge and said second edge defining boundaries of reflective difference, wherein a first axis intersects said first edge at a first point and said second edge at a second point, and wherein the distance between said first point and said second point corresponds to a location on a second axis;
   said first object being movable relative to said second object; and
   said target being imagable by said imaging apparatus.

2. The system of claim 1 wherein said target is in the shape of a triangle, said target comprising a base, a hypotenuse, and a height; wherein said base corresponds to said first edge and said hypotenuse corresponds to said second edge.

3. The system of claim 2 wherein said target is in the shape of a right triangle.

4. The system of claim 1 wherein said target is in the shape of a semicircle, said target comprising a circumference, said circumference comprising a first end, a second end, and a mid point, wherein said first edge corresponds to the section of said circumference extending between said first end and said midpoint and said second edge corresponds to the section of said circumference extending between said midpoint and said second end.

5. The system of claim 1 wherein said target further comprises a surface and wherein said surface is bounded by said first edge and said second edge.

6. The system of claim 5 wherein said surface is substantially reflective.

7. The system of claim 5 wherein the reflectivity of said surface is substantially uniform.

8. The system of claim 1 wherein said imaging apparatus is a bar code reader.

9. The system of claim 1 wherein said system is adapted to measure the length between a first point on said first edge and a second point on said second edge along said first axis.

10. The system of claim 1 wherein said target is fixedly attached to said second object.

11. The system of claim 1 wherein said imaging apparatus is fixedly attached to said first object.

12. The system of claim 1 wherein said first object is a picker device of the type used in a media handling device.

13. The system of claim 1 wherein said second object is a component comprising a media handling device.

14. The system of claim 1 wherein said second object is a media holding device of the type used in a media handling device.

15. A method of determining the position of a first object relative to a second object, said method comprising:
   providing an optical indicium associated with said second object;
   providing an imaging apparatus associated with said first object, said imaging apparatus including at least one photosensor and at least one optical component located along a light path extending between a point external to said imaging apparatus and said at least one photosensor;
   producing an image of said optical indicium with said imaging apparatus;
   measuring said image of said optical indicium along a first axis;
   determining the position of said first object relative to said second object based upon the measurement.

16. The method claim 15 wherein said determining the position of said first object relative to said second object comprises determining the position of said first object relative to said second object along a second axis which is different from said first axis.

17. The method of claim 16 wherein said first axis is substantially perpendicular to said second axis.

18. The method of claim 15 wherein said determining the position of said first object relative to said second object comprises determining the position of said first object relative to said second object along a third axis which is substantially parallel to said first axis.

19. The method of claim 15 wherein said first object is moveable relative to said second object.

20. The method of claim 15 wherein said first object is a picker device of the type used in a media handling device.

21. The method of claim 15 wherein said second object is a media holding device of the type used in a media handling device.

22. The method of claim 15 wherein said providing an indicium comprises providing an optical indicium fixedly attached to said first object.

23. The method of claim 15 wherein said providing an imaging apparatus comprises fixedly attaching said imaging apparatus to said first object, said imaging apparatus including at least one photosensor and at least one optical component located along a light path extending between a point external to said imaging apparatus and said at least one photosensor.

24. The method of claim 15 wherein said optical indicium comprises a first edge and a second edge, said first edge and said second edge defining boundaries of reflective difference, wherein a second axis intersects said first edge at a first point and said second edge at a second point, and wherein the distance between said first point and said second point corresponds to a location on said first axis.

25. The method of claim 15 wherein said optical indicium is in the shape of a triangle.

26. The method of claim 15 wherein said optical indicium is in the shape of a semicircle.

27. The method of claim 15 and further comprising:
   providing a light source; and
   illuminating said optical indicium with said light source.

28. The method of claim 15 wherein said optical indicium has a surface and wherein the reflectivity of said surface is substantially uniform.

* * * * *